United States Patent Office 3,598,616
Patented Aug. 10, 1971

3,598,616
COATING COMPOSITION WITH ORGANIC
BASE AND HEXAVALENT Cr
Geoffrey Moorehouse Gibson, Moortown, Leeds, and
Clifford Alfred Vessey, Harrogate, England, assignors
to Albright & Wilson Limited, Birmingham, England
No Drawing. Continuation-in-part of application Ser. No.
580,166, Sept. 19, 1966. This application Sept. 18,
1968, Ser. No. 774,559
Claims priority, application Great Britain, Sept. 21, 1965,
40,228/65
Int. Cl. C09d 5/08
U.S. Cl. 106—14                                    23 Claims

ABSTRACT OF THE DISCLOSURE

A paint composition having improved anti-corrosive properties is provided by admixing with the film-forming vehicle at least one hexavalent chromium salt of calcium, strontium, barium or zinc in a defined amount and a defined proportion an organic nitrogenous base or salt thereof.

---

This application is a continuation-in-part of our application, Ser. No. 580,166, filed Sept. 19, 1966, now abandoned.

This invention relates to paint compositions which are highly adherent and which have improved anti-corrosive properties.

It has long been known to employ lead chromate as a pigment in a paint composition. Furthermore, other metal chromates have been used as additives in corrosion-resisting paints. However, we have now discovered that the anti-corrosive properties of calcium, strontium, barium and zinc chromates are enhanced if there is also added to the paint sufficient of an organic nitrogenous base which would permit a significant amount of an organic dichromate to be formed in situ. It is not known whether an organic dichromate is actually formed by such admixture, but while the paint compositions of the invention are stable on storage, similar compositions in which a preformed organic dichromate is substituted for the said chromate and base or salt thereof are liable to thicken or gel during a relatively short period of storage.

It has hitherto been proposed to incorporate small amounts of a variety of nitrogenous bases in paint compositions for various purposes but not, it is believed, in paints containing hexavalent chromium compounds of barium, strontium, calcium or zinc, as distinct from lead, to the extent necessary for the superior anti-corrosive effects on corrodable metals, such as ferrous metals, and zinc, which we have discovered to be manifested.

These superior effects are obtained when the hexavalent salts of calcium, strontium, barium and zinc provide a total of 0.1 to 10 parts by weight of $CrO_3$ per 100 parts by weight of the total solids content of the paint and the nitrogenous base or salt thereof is present in an amount to provide from 0.5 to 3.0 moles of base per mole of $CrO_3$ provide as described above.

Accordingly, the present invention provides a paint composition having improved anti-corrosive properties comprising an organic film-forming vehicle, the improvement which consists essentially in having present at least one hexavalent chromium salt of calcium, strontium, barium or zinc, the said hexavalent chromium salt providing from 0.1 to 10 parts by weight of $CrO_3$ per 100 parts by weight of the total solids present and admixed in said composition at least one organic nitrogenous base or salt thereof in an amount to provide from 0.5 to 3.0 moles of base per mole of $CrO_3$ provided by the said hexavalent chromium salt.

The organic film-forming vehicle will contain a binder which may be any normally used in conventional paints. Such binder may be an organic film-forming polymer or a precursor thereof, that is a substance able to form such a polymer on exposure to the atmosphere. Particularly effective as the said vehicle are natural drying oils, such as linseed oil; oleoresinous media, that is natural drying oils that have been modified by organic polymers such as a phenolic resin; alkyd resins, especially those modified with polymerisable material such as styrene or linoleic acid; or epoxy resins. The vehicle will also contain a liquid diluent.

This will normally be an organic solvent or mixture of solvents for the binder. Illustrative of such solvents are petroleum, naphthenic, aromatic and terpenic hydrocarbons as well as ketones, esters and ethers such as the Cellosolves and similar oxyalkylene compounds.

The paint compositions of the invention comprise at least one hexavalent chromium salt of calcium, strontium, barium or zinc. Normally such salts will be the metal chromates, but double chromates such as potassium zinc chromate may also be employed. Mixtures of such hexavalent chromium compounds may be employed. Such salts are used in the compositions of the invention to provide hexavalent chromium therefrom in an amount of 0.1 to 10, preferably 0.5 to 3 parts by weight (calculated on $CrO_3$ content) per 100 parts by weight of total solids present.

The paints of the invention contain a pigment and/or extender, but such pigment may be the aforesaid hexavalent chromium salt.

However other pigments or extenders may also be present: for example, titanium dioxide, lead chromate, basic lead chromates, chromic oxide, iron oxide, talc, calcium carbonate and/or blanc fixe may be present.

The organic nitrogenous base may be used as such or as a salt thereof. A wide variety of anions can be associated with the base when it is used in the salt form, but we have found that in such cases it is preferred to employ salts formed from carboxylic acids, especially those of aromatic carboxylic acids such as benzoic acid. The base, whether used as such or as a salt thereof, is preferably one which is not inherently likely to be lost from the paint by water-leaching or volatilisation. It therefore is preferably one which has a solubility in water at 20° C. below 0.5% by weight and a vapour pressure at 20° C. below 1 mm. of mercury. The base is also desirably one which is capable of forming a dichromate salt which is stable at 20° C., that is it can be treated with chromic acid, or the base salt treated with a water-soluble inorganic dichromate, and the resulting base dichromate can be isolated and warmed to 20° C. without substantial decomposition occurring. Such base dichromate is also desirably one which has a water-solubility in water at 20° C. below 1% by weight so that if it is formed in situ in the composition it will, like the base itself, be less likely to be leached from the paint by the action of water.

One class of organic nitrogenous base which has produced particularly useful results in the anti-corrosive paints of the invention is the group consisting of acyclic guanidines, cyclic guanidines, acyclic amidines and cyclic amidines. For the purpose of the present invention, a cyclic guanidine is defined as one in which the carbon atom and two of the nitrogen atoms of the guanidine system form part of a heterocyclic ring. Similarly, a cyclic amidine is one in which the carbon atom and either or both of the nitrogen atoms of the amidine system form part of a heterocyclic ring. In acyclic guanidines and amidines the nitrogen atoms do not form part of such a ring system. Examples of these four classes for use in the present invention are as follows:

(A) ACYCLIC GUANIDINES (1) Mono-substituted, di-substituted, tri-substituted, and tetra-substituted guanidines of Formulae I, II, III, IV, V, VI or VII below, wherein R, R', R" and R'" can be the same or different, and may be a straight or branched chain alkyl group, a cycloalkyl group, an aryl group such as phenyl, alkylphenyl, halogenophenyl, alkoxyphenyl, alkylthiophenyl, biphenylyl, naphthyl or anthraquinonyl, an aralkyl group such as benzyl, or a heterocyclic radical such as 3-pyridyl, 2-thiazolyl or 2-imidazolyl. In Formulae V, VI and VII, the groups R and R' may be joined together to form with the nitrogen atom a cyclic group such as piperidino

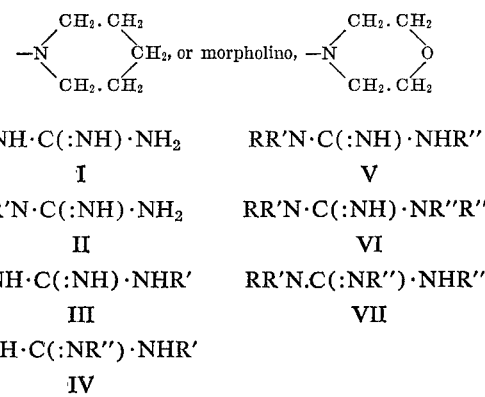

RNH·C(:NH)·NH$_2$
I

RR'N·C(:NH)·NH$_2$
II

RNH·C(:NH)·NHR'
III

RNH·C(:NR")·NHR'
IV

RR'N·C(:NH)·NHR"
V

RR'N·C(:NH)·NR"R'"
VI

RR'N·C(:NR")·NHR'"
VII

Particularly preferred members of this class are N,N',N"-triphenyl guanidine (IV, R=R'=R"=C$_6$H$_5$) and its sulphate; N,N',N"-tritolyl guanidines; N,N'-diphenyl guanidine (III, R=R'=C$_6$H$_5$) and its benzoate, p-tert.-butylbenzoate and sebacate; N,N'-ditolyl guanidines and N,N'-diphenyl N"-tert.butyl guanidine.

(2) Substituted biguanides of Formula VIII, IX, X, XI or XII, where R, R', R" and R'" may be the same or different, and have the same meaning as R, R', R", and R'" in Class 1 above. The groups R' and R" in Formulae XI and XII may together with the nitrogen atom, join together to form a ring as in Class 1, above.

RNH·C(:NH)·NH·C(:NH)·NH$_2$
VIII

RNH·C(:NH)·NH·C(:NH)·NHR'
IX

RR'N·C(:NH)·NH·C(:NH)·NH$_2$
X

RNH·C(:NH)·NH·C(:NH)·NR'R"
XI

R'R"N·C(:NH)·NH·C(:NH)·NRR'"
(XII)

Particularly preferred members of this class are α-naphthyl biguanide (VIII, R=α-C$_{10}$H$_7$) and its sulphate; phenyl biguanide (VIII, R=C$_6$H$_5$) and its sulphate benzoate and silicate; tolyl and xylyl biguanides and their benzoates; o-ethylphenyl biguanide; p-nitrophenyl biguanide; 3-chloro-4-methylphenyl biguanide; p-anilinophenyl biguanide; cyclohexyl biguanide, benzyl biguanide; N$^1$,N$^5$-diphenyl biguanide; and N$^1$-cyclohexyl,N$^5$-phenyl biguanide.

(3) Bis-biguanides of Formula XIII, where A is a divalent radical such as methylene, —CH$_2$—, a chain of methylene groups, —(CH$_2$)$_x$— (where x is a number from 2 to 10), phenylene, —C$_6$H$_4$—, naphthylene, —C$_{10}$H$_6$— or anthraquinonylene, —C$_{14}$H$_6$O$_2$—; where R, R' and R" may be the same or different, and either are hydrogen atoms or have the same meaning as R, R' and R" in Class 1 above. The groups R and R' may, together with the nitrogen atom, join together to form a ring as in Class 1 above.

RR'N·C(:NH)·NH·C(:NH)·NR"—A—NR"·C(:NH)·NH·C(NH)·NRR'

XIII

An illustrative member of this type is 1,5-bis-biguanido naphthalene.

(B) CYCLIC GUANIDINES (1) Substituted 2,4-diamino-s-triazines of Formula XIV, XV, XVI, XVII, XVIII or XIX, where R, R' and R" may be the same or different, and may be hydrogen, straight chain or branched chain alkyl, cycloalkyl, an aryl group such as phenyl, alkylphenyl, halogenophenyl, alkoxyphenyl, alkylthiophenyl, biphenylyl, naphthyl or anthraquinonyl, an aralkyl group such as benzyl or a heterocyclic radical such as 3-pyridyl, 2-thiazolyl or 2-imidazolyl. Two groups on the same nitrogen atom may join together to form a ring as in Class A(1) above; x is an integer from 1 to 10 and y is 0 or 1.

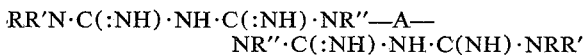

XIV    XV

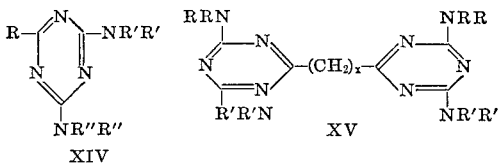

XVI

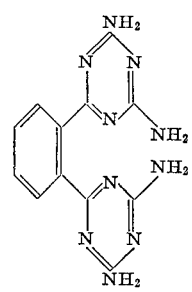

XVII

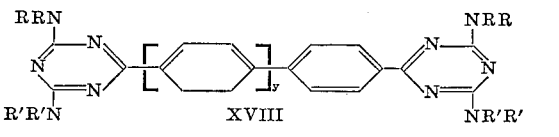

XVIII

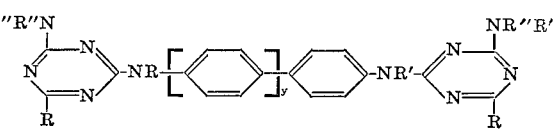

XIX

An illustrative member of this type is 2,4-diamino-6-n-butyl-s-triazine.

(2) Melamine and substituted melamines of Formula XX, XXI or XXII, where R, R' and R" may be the same or different and have the same meaning as R, R' and R" in Class B.1 above; two groups on the same nitrogen atom may join together to form a ring as in Class A.1 above, x is an integer from 1 to 10 and y is 0 or 1.

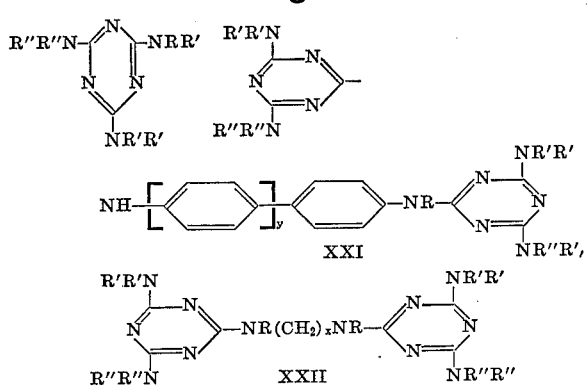

 

 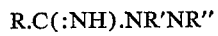

(C) ACYCLIC AMIDINES (1) Substituted and unsubstituted amidines of Formula XXIII, XXIV, XXV or XXVI, where R, R' and R" may be the same or different, and have the same meaning as R, R' and R" in Class A.1 above. The groups R' and R" in Formula XXVI may join together to form a ring as in Class A.1 above.

$R.C(:NH).NH_2$      $R.C(:NH).NHR'$
XXIII             XXIV $R.C(:NR").NHR'$      $R.C(:NH).NR'NR"$
XXV             XXVI (2) Amidino sulphides of the general formula $R.S.C(:NH).NH_2$ XXVII where R has the same meaning as R in Class A.1 above.

(D) CYCLIC AMIDINES

Substituted 2-aminopyridines or 2-amino-quinolines of Formula XXVIII or XXIV respectively, where R and R' may be the same or different, and have the same meaning as R and R' in Class A.1 above. In addition R may also be hydrogen.

Another useful type of cyclic amidine is provided by the condensation products of ethylene diamine and diethylene triamine with carboxylic acids of formula R.CO.OH, R being a branched chain group where the branching has arisen through substitution of alkyl or cycloalkyl groups on one or more of the carbon atoms of the chain, or indeed, by actual link-up of such a substituent alkyl group with the chain to form a cycloalkyl group. An example of such a carboxylic acid is provided by the well-known class of naturally occurring petroleum carboxylic acids called naphthenic acids. Such acids of formula R.CO.OH will react with ethylene diamine and diethylene triamine on heating to give the basic mono amides $R.CO.NH.CH_2.CH_2.NH_2$ and $R.CO.NH.CH_2.CH_2.NH.CH_2.CH_2.NH_2$ respectively. On further heating, these compounds undergo cyclodehydration to the corresponding imidazolines of formulae:

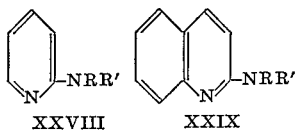

respectively. Examples of preferred bases of this class are the imidazolines of Formulas XXX and XXXI derived respectively from ethylene diamine and diethylene triamine and naphthenic acids, for example those as marketed under the trade name of naphthenic acid NA 230/SP. Such bases are preferably employed in the form of their benzoate salts.

A further class of organic nitrogenous bases which has produced particularly useful results in the anti-corrosive paints of the invention is the group of amines of formulas $RNH_2$, $RR'NH$ and $RR'R"N$ and quaternary ammonium salts having cation of formula $[RR'R"R"'N]^+$ wherein R, R', R" and R"' may be the same or different and may be alkyl, unsaturated alkyl or cycloalkyl or (in the case of R"') may be aryl. Illustrative of this general type ore 2-ethyl-n-hexylamine (as such or as its benzoate), dicyclohexylamines, oleylamine and $C_{16-18}$ alkylamines such as n-octadecylamine and di-n-octadecylamine. Amines of this class which are particularly preferred are those branched chain amines containing an alkyl group having from 10 to 22 carbon atoms. Particularly preferred are the amines wherein such alkyl group has a tertiary carbon atom which is linked to nitrogen, such as tert.-dodecylamine and tert.-octadecylamine, for example the mixture of amines as sold under the trade names Primene 81R and JM–T. Also particularly useful are 2-aminoalkanes having from 10 to 22 carbon atoms, such as 2-amino-n-undecane and 2-amino-n-pentadecane, for example as sold under the trade names Armeen L.11 and Armeen L.15. The carboxylate salts, particularly the benzoate, p-tert.-butylbenzoate and phthalate salts of such amines and 2-amino-n-nonane benzoate are especially useful in the improved paint compositions of the invention.

It will be understood that throughout this invention it will usually be preferred to select a base that has a water-solubility at 20° C. below 0.5% by weight, a vapour pressure at 20° C. below 1 mm. of mercury and is capable of forming a dichromate stable at 20° C. and has a solubility in water at 20° C. below 1.0% by weight, as aforesaid.

The organic nitrogenous base is incorporated in the paint of the invention, as such or as a salt thereof, in an amount to provide from 0.5 to 3.0 moles of base per mole of $CrO_3$ provided by the hexavalent chromium salt of calcium, strontium, barium or zinc. Optimum results are usually obtained by the provision of at least 0.9 mole of base on this basis and the preferred range is from 0.9 to 2.0 moles of base.

The paints of the invention may also contain other conventional paint additives: for example, catalysts for the polymerisation of the binder, such as lead and/or cobalt salts as naphthenate driers; anti-settling agents; biocides and the like may be present.

The paints of the invention provide improved corrosion resistance to corrodable metals, for example to ferrous metals, zinc and galvanized iron. They may also be used to protect aluminum.

The invention is further illustrated by the following examples, in which all parts are expressed by weight.

Examples 1–4

Paints A–G were prepared with a common base composition as follows:

| | Parts |
|---|---|
| Linseed oil-modified pentaerythritol alkyd resin, 75% non-volatile (for example as sold under the trade name EPOK 1060/75) | 21 |
| Iron oxide | 18 |
| Blanc fixe | 23 |
| Calcium carbonate | 6 |
| Talc | 6 |
| White spirit (aliphatic) | 12 |
| White spirit (aromatic | 2.5 |
| Xylene | 5.5 |
| Lead naphthenate in white spirit (24% Pb) | 0.33 |
| Cobalt naphthenate in white spirit (6% Co) | 0.13 |

With this common base other ingredients were incorporated as follows:

Paint A (Example 1): Calcium chromate, 1.9 parts; N,N',N''-triphenylguanidine, 6.7 parts Paint B (comparative): N,N',N''-triphenylguanidine 6.7 parts Paint C (comparative): Calcium chromate, 1.9 parts Paint D (Example 2): Zinc chromate, 4.7 parts; N,N',N''-triphenylguanidine, 6.7 parts Paint E (comparative): Zinc chromate, 4.7 parts;

Paint F (Example 3): Calcium chromate, 1.9 parts; phenylbiguanide, 4.1 parts

Paint G (Example 4): Calcium chromate, 1.9 parts; t-dodecylamine benzoate, 7.4 parts Each paint was diluted with white spirit to a suitable viscosity and was separately brushed on to mild steel panels which had been degreased and burnished to give films which when dry had a thickness of 0.0005–0.0006 inch. After the panels had aged for 24 hours, they were given a coat of an alkyd-based undercoat and 24 hours later a coat of alkyd-based gloss finish. Seven days after applying the final coat, the panels were scratched diagonally and submitted to 1000 hours exposure in a continuous salt spray (United Kingdom Defence Specification DEF1053, Method No. 24).

The results were as follows:

Paints A, D and F: No blistering of paint; no loss of adhesion or spread of corrosion from the scratches.

Paints B and C: Severe blistering and lifting of the paint film from the metal substrate, as well as some spread of metallic corrosion from the scratch.

Paint E: Blistering and loss of adhesion of the paint film as far as ¼ inch from the scratch and metallic corrosion had spread from the scratch in several areas.

Further tests were carried out on some of the paints by preparing painted panels in the same way. These were not scratched but placed in a humidity cabinet for 500 hours (United Kingdom Defence Specification DEF1053, Method No. 25) and the paint then removed from the panels. The results were as follows:

Paints D, F and G: Metal underneath paint completely free from corrosion.

Paint E: Many small areas of pitting corrosion visible beneath paint.

Yet further tests were carried out on paints G and E, each being applied to mild steel panels at a dry film thickness of 0.0006 inch. After the paint films had aged for 7 days, they were scratched diagonally and the panels were submitted to 300 hous exposure to a continuous salt spray. At the end of this time, there was no blistering of paint G, which even in the area adjacent to the scratch still adhered extremely tenaciously to the metal. Removal of the paint film showed that there had been no spread of corrosion from the scratch. By contrast, paint E had blistered and lifted from the substrate in the area adjacent to the scratch and corrosion of the metal had also occurred in this area.

Example 5

Paint H was prepared, having the following composition:

| | Parts |
|---|---|
| Linseed oil (acid refined) | 8.7 |
| Linseed stand oil (40–50 poises) | 8.0 |
| Iron oxide | 18 |
| Blanc fixe | 23 |
| Calcium carbonate | 6 |
| Talc | 6 |
| N,N',N''-triphenylguanidine | 6.7 |
| Calcium chromate | 1.9 |
| White spirit | 15 |
| Lead naphthenate in white spirit (24% Pb) | 0.35 |
| Cobalt naphthenate in white spirit (6% Co) | 0.14 |

A comparative paint I was prepared in the same way except that the triphenylguanidine and calcium chromate were omitted, being replaced by 7.8 parts of potassium zinc chromate.

Mild steel plates were painted with two coats of paint H applied at an interval of 48 hours to a total dry film thickness of 0.0015 inch; other plates were similarly painted with paint I. After a further 48 hours all the plates were treated with a final coat of aluminium finishing paint. When the final coat had aged for 7 days, some panels were diagonally scratched and submitted to 1000 hours continuous salt spray while the others were left unscratched and were placed in a humidity cabinet for 500 hours.

At the end of the salt spray test, the panels coated with paint H showed only slight blistering of the paint film (as far as 1/16 inch from the scratch) and a very few small areas of metallic corrosion adjacent to the scratch, paint I, on the other hand, had blistered badly (as far as ¾ inch from the scratch) and there were several large areas of metallic corrosion adjacent to the scratch as well as slight corrosion elsewhere.

At the end of the humidity test, although slight blistering of the paint had occurred on all the panels, the metal under paint H was entirely free from corrosion, whereas there were many small areas of corrosion on the metal underneath paint I.

Example 6

Paint J was prepared having the following composition:

| | Parts |
|---|---|
| Medium oil, dehydrated castor oil alkyl resin (50% non-volatile) (for example as sold under the trade name Beckesol 2911) | 36.2 |
| Iron oxide | 20.3 |
| Blanc fixe | 16.3 |
| Calcium carbonate | 6.5 |
| Talc | 6.5 |
| N,N'-diphenylguanidine | 3.6 |
| Calcium chromate | 1.9 |
| Xylol | 6.1 |
| White spirit | 2.5 |
| Cobalt naphthenate in white spirit (6% Co) | 0.15 |

A comparative paint K was prepared in the same way as paint I except that instead of the diphenylguanidine and calcium chromate, 5.5 parts of potassium zinc chromate were used, extra blanc fixe being added to maintain a pigment volume concentration of 50% in both paints.

The paints were applied by brushing at the same rate of coverage to mild steel panels which had been pre-rusted under identical conditions and then wirebrushed to Swedish Standard C St1. The painted panels were exposed outdoors in an industrial atmosphere for a period of 78 weeks. At the end of this time, the degree of rusting was assessed according to the European Rusting Scale (RE 0=rust free; RE 9=complete rusting). The panels painted with paint J had a satisfactory rating of RE 4 while those painted with paint K had an unsatisfactory rating of RE 7.

Example 7

Paints L and M were prepared having the same compositions as paints J and K respectively in Example 6, except that instead of the alkyd resin, 32.9 parts of an oleoresinous binder (55% non-volatile) was used, this being linseed oil reinforced with a phenolic resin (for example as sold under the trade name Heydon D.136). The paints were applied at the same film thickness (0.0005 inch) to mild steel panels which had been degreased and burnished. After 24 hours, a second coat of the same paint was applied at 0.0005 inch to each panel and 7 days later the panels were exposed outdoors in an industrial atmosphere. The panels were assessed after 76 weeks in the same way as those in Example 6. The panels coated with paint L had a very good rating of RE 2, whereas those coated with the comparative paint M had the much inferior rating of RE 5.

Example 8

A paint N was prepared having the following composition:

| | Parts |
|---|---|
| Melamine-epoxy copolymer (60% non-volatile) | 31.0 |
| Iron oxide | 29.3 |
| Blanc fixe | 4.7 |
| Primene 81 R benzoate | 7.4 |
| Calcium chromate | 1.9 |
| Xylol | 19.2 |
| Butanol | 6.5 |

A similar comparative paint O was prepared in which the Primene 81 R benzoate and calcium chromate were replaced by 5.8 parts of potassium zinc chromate.

Each paint was sprayed on to degreased and burnished mild steel panels so as to give paint films of equal thickness. The panels were then stoved at 150° C. for 40 minutes. One set of panels was scratched diagonally and submitted to 300 hours exposure in a continuous salt spray (United Kingdom Defence Specification DEF1053, Method No. 24). At the end of this period the panels coated with paint N showed no corrosion of the underlying metal whereas those coated with paint O exhibited corrosion spreading from the scratch. A second set of panels, which was not scratched, was exposed for 300 hours in a humidity cabinet (Defence Specification DEF1053, Method No. 25). At the end of this test, the metal underneath paint N was completely free from corrosion, whereas an appreciable amount of pitting corrosion had occurred on the metal underneath paint O.

Example 9

Paint P was prepared according to the following formulation:

| | Parts |
|---|---|
| A 70% non-volatile linoleic-rich dehydrated castor oil alkyd resin, modified with 36% styrene (for example as sold under the trade name Scopol 71 NX/70) | 21.2 |
| Lead chromate pigments | 25.9 |
| Titanium dioxide | 3.1 |
| Blanc fixe | 19.2 |
| Talc | 5.6 |
| Calcium carbonate | 5.6 |
| Primene 81 R benzoate | 8.3 |
| Zinc chromate | 2.9 |
| Xylol | 18.1 |
| Cobalt naphthenate in white spirit (6% Co) | 0.07 |

A similar comparative paint Q was prepared in which the Primene 81 R benzoate was omitted.

Degreased and burnished mild steel panels were coated to the same film thickness respectively with paints P and Q. After the paint films had aged for 7 days, one set of panels was diagonally scratched and then exposed in a continuous salt spray for 300 hours. At the end of this time the panels coated with paint P showed negligible blistering of the paint film and no corrosion of the underlying metal, whereas those coated with paint Q showed general blistering of the paint film and corrosion of the metal spreading one eighth of an inch away from the scratch.

A second set of panels (unscratched) was exposed for 300 hours in a humidity cabinet. At the end of this time, the metal underneath paint P showed no corrosion, whereas that underneath paint Q was appreciably corroded.

Examples 10–14

Base paints were prepared as described in Example 1 with addition of other ingredients as follows:

Paint R (Example 10): Calcium chromate, 3.5 parts; α-naphthyl biguanide, 2.5 parts Paint S (comparative): Potassium zinc chromate, 4.7 parts Paint T (Example 11): Calcium chromate, 3.5 parts; α-naphthyl biguanide sulphate, 6.0 parts Paint U (Example 12): Potassium zinc chromate, 0.8 part; N,N′,N″-triphenylguanidine, 2.0 parts Paint V (comparative): Potassium zinc chromate, 0.8 part Paint W (Example 13): Calcium chromate, 3.4 parts; di-n-octadecylamine, 11 parts Paint X (comparative): Potassium zinc chromate, 4.7 parts Paint Y (Example 14): Calcium chromate, 3.4 parts; Armeen L.11 benzoate, 6.7 parts Panels were prepared and tested according to United Kingdom Defence Specification DEF1053. Method No. 24 as described in Example 1. Paints R, T and W gave panels which showed less blistering of the paint and less spread of metallic corrosion from the scratch than the panels coated with paints S and X.

Paints U, V and Y were tested according to 300-hour salt spray test described in Example 4 for paint G. At the end of this test paint U showed no blistering or loss of adhesion, whereas paint V had blistered appreciably and there was considerable loss of adhesion to the underlying metal. In addition, the metal under paints U and Y showed less corrosion than that underneath paints V and X respectively.

Paints W and X were also tested according to United Kingdom Defence Specification DEF1053, Method No. 25, as described in Example 1. Afterwards the metal underneath paint W was completely free from corrosion, whereas that underneath paint X showed many small areas of pitting corrosion.

Example 15

Paint Z was prepared having the following formulation:

| | Parts |
|---|---|
| Short oil, dehydrated castor oil epoxy ester resin 60% non-volatile (for example as sold under trade name Synolac 463X) | 26.3 |
| Iron oxide | 18 |
| Blanc fixe | 23 |
| Calcium carbonate | 6 |
| Talc | 6 |
| N,N′-diphenylguanidine | 4.4 |
| Calcium chromate | 1.7 |
| Xylene | 18 |
| Aromatic white spirit | 3 |
| Cobalt naphthenate in white spirit (6% Co) | 0.1 |

A comparative paint $Z^1$ was similarly prepared except that the diphenylguanidine was omitted and the calcium chromate replaced by 7.7 parts of potassium zinc chromate. Panels were prepared and tested according to United Kingdom Defence Specification DEF1053, Method No. 24, as described in Example 1. The resulting panels coated with paint Z showed less blistering of the paint film and less spread of metallic corrosion from the scratch than the panels coated with paint $Z^1$.

Panels were also prepared and tested according to United Kingdom Defence Specification DEF1053, Method No. 25, as also described in Example 1. The resulting panels coated with paint Z showed less blistering of the paint film and less corrosion of the underlying metal than the panels coated with paint $Z^1$.

We claim:
1. In a paint composition having improved anti-corrosive properties comprising a resinous organic film-forming vehicle being at least one polymer selected from the group consisting of natural drying oils, oleoresinous media, alkyd resins and epoxy resins, the improvement which consists essentially in having admixed in said composition (i) at least one hexavalent chromium salt of calcium, strontium, barium, or zinc, the said hexavalent chromium salt providing from 0.1 to 10 parts by weight of $CrO_3$ per 100 parts by weight of the total solids present and (ii) at least one nitrogenous compound selected from the group consisting of (a)

N,N',N''-triphenyl guanidine,
N,N',N''-tritolyl guanidine,
N,N'-diphenyl guanidine,
N,N'-ditolyl guanidine,
N,N'-diphenyl-N''-tert.-butyl guanidine,
alpha-naphthyl biguanide,
phenyl biguanide,
tolyl biguanide,
xylyl biguanide,
o-ethylphenyl biguanide,
p-nitrophenyl biguanide,
3-chloro-4-methylphenyl biguanide,
p-anilino-phenyl biguanide,
cyclohexyl biguanide,
benzyl biguanide,
$N',N^5$-diphenyl biguanide,
$N'$-cyclohexyl, $N^5$-phenyl biguanide,
1,5-bis-biguanido naphthalene,
2,4-diamino-6-n-butyl-s-triazine,
2-ethyl-n-hexylamine,
dicyclohexylamine,
oleylamine,
n-octadecylamine,
di-n-octadecylamine,
aminoalkanes wherein the alkyl group has 10–22 carbon atoms and contains a tertiary carbon atom linked to nitrogen,
2-aminoalkanes wherein the alkane group contains 10–22 carbon atoms, and
2-amino-n-nonane and (b) salts thereof, in an amount to provide from about 0.5 to 3 moles of said nitrogenous compound per mole of $CrO_3$ provided by the said hexavalent chromium salt.

2. A paint composition as claimed in claim 1 wherein the said nitrogenous compound is one which has a solubility in water at 20° C. below 0.5% by weight, a vapour pressure at 20° C. below 1 mm. of mercury and being capable of forming a dichromate stable at 20° C., said dichromate having a solubility in water at 20° C. below 1.0% by weight.

3. A paint composition as claimed in claim 1 wherein N,N',N''-triphenyl guanidine or a N,N',N''-tritolyl guanidine is employed as the said nitrogenous compound.

4. A paint composition as claimed in claim 1 wherein N,N'-diphenyl guanidine or a N,N'-di-tolyl guanidine is employed as the said nitrogenous compound.

5. A paint composition as claimed in claim 1, wherein the said nitrogenous compound is employed in an amount to provide at least 0.9 mole of nitrogenous compound per mole of $CrO_3$ provided by the said hexavalent chromium salt.

6. A paint composition as claimed in claim 1 wherein the said nitrogenous compound is employed in an amount to provide from 0.9 to 2.0 moles of nitrogenous compound per mole of $CrO_3$ provided by the said hexavalent chromium salt.

7. In a paint composition having improved anticorrosive properties comprising an organic resinous film-forming vehicle being at least one polymer selected from the group consisting of natural drying oils, oleoresinous media, alkyd resins and epoxy resins, the improvement which consists essentially in having present at least one hexavalent chromium salt of calcium, strontium, barium or zinc, the said hexavalent chromium salt providing from 0.1 to 10 parts by weight of $CrO_3$ per 100 parts by weight of the total solids present and admixed in said composition at least one organic nitrogenous base or salt thereof in an amount to provide from 0.5 to 3.0 moles of base per mole of $CrO_3$ provided by the said hexavalent chromium salt, said nitrogenous base being selected from the group of amines of formulae $RNH_2$, $RR'NH$ and $RR'R''N$ and quaternary ammonium salts having cation of formula $(RR'R''R''N)^+$ wherein R, R' and R'' are each an alkyl having between about 10 and 22 carbon atoms.

8. A paint composition as claimed in claim 7 wherein the said organic nitrogenous base is a branched chain amine containing an alkyl group having from 10 to 22 carbon atoms.

9. A paint composition as claimed in claim 8 wherein the said $C_{10-22}$ alkyl group in the said amine contains a tertiary carbon atom which is linked to nitrogen.

10. A paint composition as claimed in claim 7, wherein the said organic nitrogenous base is a 2-amino-n-alkane.

11. A paint composition as claimed in claim 8 wherein the said base is admixed as a carboxylate salt thereof.

12. A paint composition as claimed in claim 9 wherein the said base is employed as benzoate salt thereof.

13. A paint composition as claimed in claim 7 wherein the said hexavalent chromium salt provides from 0.5 to 3.0 parts by weight of $CrO_3$ per 100 parts by weight of the total solids present.

14. A paint composition as claimed in claim 7 wherein the said organic nitrogenous base or salt thereof is employed in an amount to provide at least 0.9 mole of base per mole of $CrO_3$ provided by the said hexavalent chromium salt.

15. A paint composition as claimed in claim 13 wherein the said organic nitrogenous base or salt thereof is employed in an amount to provide from 0.9 to 2.0 moles of base per mole of $CrO_3$ provided by the said hexavalent chromium salt.

16. A paint composition as claimed in claim 1 wherein said nitrogenous compound is selected from the group consisting of monocyclic-aryl guanidines, and monocyclic-aryl biguanides, said monocyclic-aryl groups containing 6 carbon atoms as the aryl ring.

17. A paint composition as claimed in claim 1 wherein said nitrogenous compound is selected from the group consisting of 2-ethyl-n-hexylamine
dicyclohexylamine
n-octadecylamine
di-n-octadecylamine
tert.-dodecylamine
tert.-octadecylamine
2-amino-n-undecane
2-amino-n-pentadecane 18. A paint composition as claimed in claim 17 wherein said salt of said nitrogenous compound is at least one salt selected from the benzoate, p-tert-butylbenzoate and phthalate salts.

19. A paint composition as claimed in claim 1 wherein the said hexavalent chromium salt provides from 0.5 to 3 parts by weight of $CrO_3$ per 100 parts by weight of the total solids present.

20. A paint composition as claimed in claim 19 wherein said nitrogenous compound is selected from the group consisting of N,N',N''-triphenyl guanidine,
phenyl biguanide,
N,N'-diphenyl guanidine,
the benzoate salts of tert-aminoalkanes wherein the alkyl chain contains 10–22 carbon atoms,
alpha-naphthyl biguanide,
alpha-naphthyl biguanide sulphate,
2-amino-n-nonane benzoate,
di-n-octadecylamine, and
normal-aminoalkanes wherein the alkyl group contains 10–22 carbon atoms.

21. A paint composition as claimed in claim 20 wherein said hexavalent chromium salt is selected from the group consisting of calcium chromate, zinc chromate and potassium zinc chromate.

22. A paint composition as claimed in claim 10 wherein the said base is employed as the benzoate salt thereof.

23. A paint composition as claimed in claim 19 wherein said nitrogenous compound is selected from the group consisting of t-dodecylamine benzoate, t-dodecylamine, and t-octadecylamine.

References Cited

UNITED STATES PATENTS

| | | | |
|---|---|---|---|
| 2,319,668 | 5/1943 | Edmunds | 106—14 |
| 2,430,589 | 11/1947 | Sloan | 106—14 |
| 2,466,517 | 4/1949 | Blair | 106—14 |
| 2,450,807 | 10/1948 | McCarthy | 106—14 |
| 2,819,284 | 1/1958 | Shen | 252—390 |
| 3,376,143 | 4/1968 | Barkman | 106—14 |
| 3,384,590 | 5/1968 | Eversole | 252—394 |

FOREIGN PATENTS

| | | | |
|---|---|---|---|
| 556,592 | 4/1958 | Canada | 106—14 |

LORENZO B. HAYES, Primary Examiner

U.S. Cl. X.R.

106—253; 117—134; 252—390; 260—40